United States Patent
Haon et al.

(10) Patent No.: US 10,601,938 B2
(45) Date of Patent: Mar. 24, 2020

(54) ORGANIZATIONALLY PROGRAMMABLE INTRANET PUSH NOTIFICATIONS

(71) Applicant: Microsoft Technology Licensing, LLC, Redmond, WA (US)

(72) Inventors: Andrew Haon, Seattle, WA (US); Nathaniel Terrell Clinton, Redmond, WA (US); Dmitriy Meyerzon, Bellevue, WA (US); Adri Verlaan, Seattle, WA (US); Nikita Voronkov, Bothell, WA (US); Jeffrey L. Wight, Kirkland, WA (US); Kristen Kamath, Seattle, WA (US); Zhihua Dong, Bellevue, WA (US); David M Cohen, Duvall, WA (US); Ryan Nakhoul, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 15/486,007

(22) Filed: Apr. 12, 2017

(65) Prior Publication Data
US 2018/0302482 A1    Oct. 18, 2018

(51) Int. Cl.
*H04L 29/08* (2006.01)
*H04L 12/58* (2006.01)
*G06Q 30/02* (2012.01)
*G06Q 10/10* (2012.01)

(52) U.S. Cl.
CPC .......... *H04L 67/26* (2013.01); *G06Q 10/107* (2013.01); *G06Q 30/0269* (2013.01); *G06Q 30/0281* (2013.01); *H04L 51/22* (2013.01); *H04L 51/24* (2013.01)

(58) Field of Classification Search
None
See application file for complete search history.

(56) References Cited

U.S. PATENT DOCUMENTS

| | | | |
|---|---|---|---|
| 6,457,045 B1 * | 9/2002 | Hanson | G06Q 10/107 707/999.01 |
| 6,782,415 B1 | 8/2004 | Quine | |
| 9,485,212 B1 * | 11/2016 | Bastide | H04L 51/32 |
| 2005/0038863 A1 * | 2/2005 | Onyon | G06Q 10/107 709/207 |
| 2008/0114847 A1 | 5/2008 | Ma et al. | |
| 2008/0162364 A1 | 7/2008 | Martin et al. | |

(Continued)

OTHER PUBLICATIONS

"Go mobile to publish internal news faster and smarter", https://www.orteccommunications.com/relevance-app/, Retrieved on: Jan. 23, 2017, 19 pages.

(Continued)

*Primary Examiner* — Jeffrey R Swearingen
(74) *Attorney, Agent, or Firm* — Schwegman Lundberg & Woessner, P.A.

(57) ABSTRACT

Among other things, embodiments of the present disclosure help improve the functionality of electronic messaging software and systems by providing selective push notifications to users of such systems in response to new content being published. Embodiments of the present disclosure may provide notifications to some users based on the relevance of published content to such users, while abstaining from notifying users for whom the content is irrelevant.

15 Claims, 10 Drawing Sheets

(56) References Cited

U.S. PATENT DOCUMENTS

| | | |
|---|---|---|
| 2008/0255919 A1 | 10/2008 | Gorder |
| 2010/0088378 A1* | 4/2010 | Asawa .................. H04L 51/24 709/206 |
| 2010/0299727 A1 | 11/2010 | More et al. |
| 2011/0320538 A1 | 12/2011 | Ickman et al. |
| 2012/0143965 A1 | 6/2012 | Parker et al. |
| 2012/0192086 A1 | 7/2012 | Ghods |
| 2014/0143139 A1 | 5/2014 | Koplovitz et al. |
| 2014/0304238 A1 | 10/2014 | Halla-aho et al. |
| 2014/0337314 A1 | 11/2014 | Potapov et al. |
| 2015/0019575 A1 | 1/2015 | Dayon et al. |
| 2015/0181556 A1 | 6/2015 | Dey et al. |
| 2015/0347585 A1 | 12/2015 | Klotz |
| 2016/0086228 A1 | 3/2016 | Babb et al. |
| 2016/0248853 A1 | 6/2016 | Chiu |
| 2016/0371729 A1* | 12/2016 | Glover ............... G06Q 30/0255 |

OTHER PUBLICATIONS

"IBM Alert Notification", http://www.ibm.com/support/knowledgecenter/en/SSY487/com.ibm.netcool_OMNIbusaas.doc_1.2.0/concept/emaas_ins_overview.html, Retrieved on: Jan. 23, 2017, 1 pages.

"Adobe Experience Manager Mobile", https://blogs.adobe.com/aemmobile/2015/10/three-ways-to-make-apps-that-your-employees-will-actually-use.html, Published on: Oct. 21, 2015, 3 pages.

Tariq, Hamzah, "The Power of Push Notifications in Internal Communication", https://www.reachplus.com/the-power-of-push-notifications-in-internal-communication/, Published on: Jan. 9, 2014, 2 pages.

Purse, Jill, "Intranet Notifications Keep Employees Up-To-Date and Engaged", https://www.thoughtfarmer.com/blog/7-0-intranet-notifications/, Published on: Jun. 11, 2014, 5 pages.

Wolf, Frank, "Mobile Intranet CMS—Communication and News Management", , Jan. 23, 2017, 15 pages.

"Desktop Alert Software", http://www.snapcomms.com/products/desktop-alert, Retrieved on: Jan. 23, 2017, 6 pages.

"Easi Sms", https://collegelisted.com/blogs/sample-essays/easi-sms, Retrieved on: Jan. 23, 2017, 7 pages.

"Bitrix Intranet Portal", http://www.bitrixsoft.com/download/files/bitrix_reviewers_guide.pdf, Published on: Apr. 2010, 13 pages.

"How to Engage Your Employees with Push Notifications and Banner Messages—Modo Labs", https://www.modolabs.com/blog-post/how-to-engage-your-employees-with-push-notifications-and-banner-messages/, Published on: Nov. 13, 2015, 7 pages.

Hauswirth, et al., "A Component and Communication Model for Push Systems", In Proceedings of 7th European Software Engineering Conference Held Jointly with the 7th ACM SIGSOFT Symposium on the Foundations of Software Engineering Toulouse, Sep. 6, 1999, 19 pages.

"International Search Report and Written Opinion Issued in PCT Application No. PCT/US2018/025618", dated May 25, 2018, 11 Pages.

"International Search Report and Written Opinion Issued in PCT Application No. PCT/US2018/039203", dated Oct. 30, 2018, 12 Pages.

"Non Final Office Action Issued in U.S. Appl. No. 15/714,677", dated Jul. 11, 2019, 25 Pages.

"Non Final Office Action Issued in U.S. Appl. No. 15/713,321", dated Sep. 16, 2019, 14 Pages.

* cited by examiner

ORGANIZATIONALLY PROGRAMMABLE INTRANET PUSH NOTIFICATIONS

BACKGROUND

Document management systems allow users to create, edit, and share electronic documents. Some document management systems provide notifications to users as content (such as documents and articles) and other resources are added to the system, also referred to herein as "publishing" a document. Within the context of an organization or enterprise, some users may wish to receive real time or near-real time notifications when someone else needs access to a resource, or when particular individuals or group members publish a piece of content. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
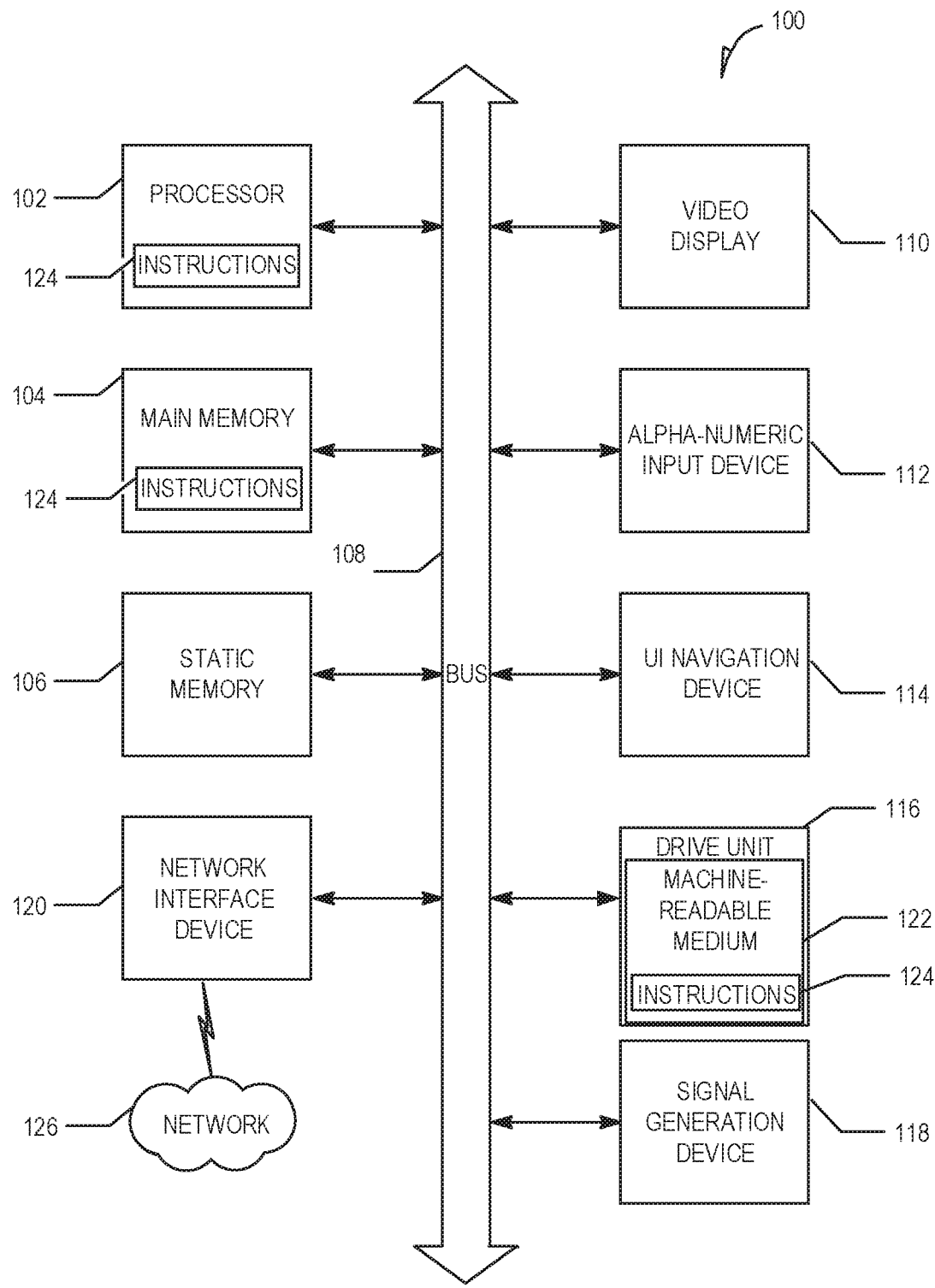
FIG. 1 is a block diagram illustrating an exemplary system according to various aspects of the disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure help improve the functionality of electronic messaging software and systems by providing selective push notifications to users of such systems in response to new content being published. Embodiments of the present disclosure may provide notifications to some users based on the relevance of published content to such users, while abstaining from notifying users for whom the content is irrelevant.

Embodiments of the present disclosure described herein may be implemented using any combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Embodiments of the present disclosure may include, or may operate in conjunction with, various logic, components, modules, and mechanisms. Such components may include any combination of hardware, software, or firmware communicatively coupled to one or more processors in order to carry out the operations described herein. Components may be hardware components, and as such components may be considered tangible entities capable of performing specified operations and may be configured or arranged in a certain manner. For example, circuits may be arranged (e.g., internally or with respect to external entities such as other circuits) in a specified manner as a component. The whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In some exemplary embodiments, software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform the methodologies described herein.

FIG. 1 is a block diagram illustrating an exemplary embodiment of a computer system 100, within which a set or sequence of instructions may be executed to cause the system to perform any of the functionality discussed herein. In some exemplary embodiments, the system 100 may operate as a standalone device or may be connected (e.g., networked) to other machines. In a networked deployment, the system may operate in the capacity of either a server or a client system in server-client network environments, or it may act as a peer machine in peer-to-peer (or distributed) network environments. The system may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine.

While only a single computer system is illustrated in FIG. 1, the terms "system," "machine," or "device" may include any collection of systems, machines, or devices that individually or jointly perform various functionality of the embodiments of the present disclosure. Similarly, the term "processor-based system" may include any set of one or more machines that are controlled by or operated by a processor (e.g., a computer) to individually or jointly execute instructions to perform any one or more of the methodologies discussed herein.

The exemplary computer system 500 in FIG. 1 includes a processor 102 (e.g., a central processing unit (CPU), a graphics processing unit (GPU) or both, processor cores, compute nodes, etc.), a main memory 104 and a static memory 106, which communicate with each other via a link 108 (e.g., bus). The computer system 100 may further include a video display unit 110, an alphanumeric input device 112 (e.g., a keyboard), and a user interface (UI) navigation device 114 (e.g., a mouse). In one embodiment, the video display unit 110, input device 112 and UI navigation device 114 are incorporated into a touch screen display. The computer system 100 may additionally include a storage device 116 (e.g., a drive unit), a signal generation device 118 (e.g., a speaker), a network interface device 120, and one or more sensors (not shown), such as a global positioning system (GPS) sensor, compass, accelerometer, or other sensor.

The storage device 116 includes a machine-readable medium 122 on which is stored one or more sets of data structures and instructions 124 (e.g., software) embodying or utilized by any one or more of the methodologies or functions described herein. The instructions 124 may also reside, completely or at least partially, within the main memory 104, static memory 106, and/or within the processor 102 during execution thereof by the computer system 100, with the main memory 104, static memory 106, and the processor 102 also constituting machine-readable media.

While the machine-readable medium 122 is illustrated to be a single medium, the term "machine-readable medium" may include a single medium or multiple media (e.g., a centralized or distributed database, and/or associated caches and servers) that store the one or more instructions 124. The term "machine-readable medium" may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" may include, for example, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 124 may be transmitted or received over a communications network 126 using a transmission medium via the network interface device 120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Figure 2:
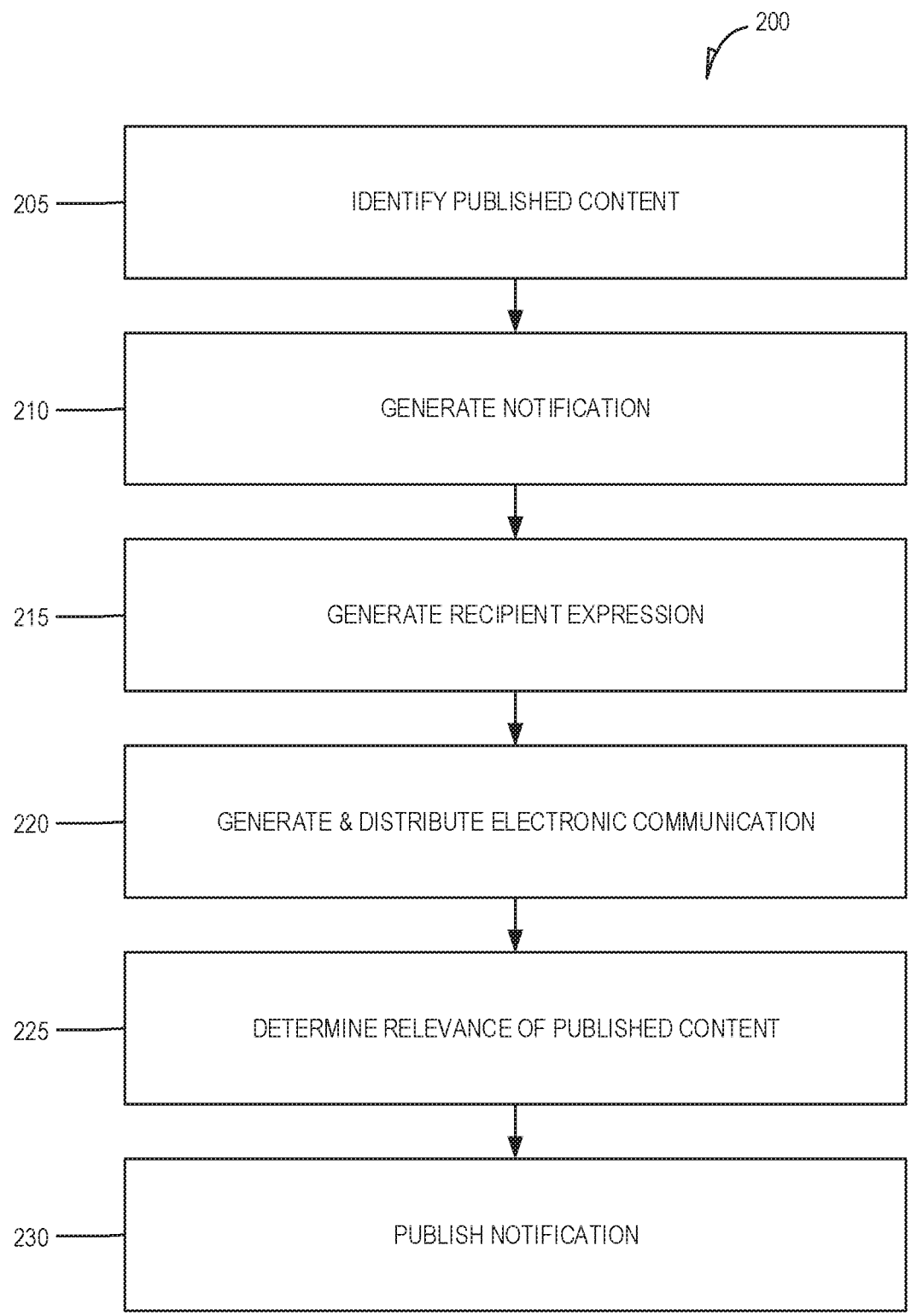
FIG. 2 illustrates a flowchart of an exemplary method according to various aspects of the disclosure.

FIG. 2 depicts an exemplary process according to various aspects of the present disclosure. In this example, method 200 includes identifying published content (205), generating a notification associated with the published content (210), generating an expression defining a list of recipients to receive the notification (215), generating an electronic communication containing the notification and distributing the electronic communication to the recipients (220), determining the relevance of the published content (225), and publishing the notification (230). The steps of method 200 may be performed in whole or in part, may be performed in conjunction each other as well as with some or all of the steps in other methods, and may be performed by any number of different systems, such as the system described in FIG. 1.

Embodiments of the present disclosure can identify published content (205), such as news articles, alerts, documents, and other content published via a document management system. The document management system may be implemented by the system (in whole or in part) by the system(s) performing the functionality of method 200, as well as by any combination of other systems and devices (e.g., in communication with each other via a network such as the Internet). Embodiments of the present disclosure may also operate in conjunction with content published by other types of software applications and systems, such as social media systems.

Figure 3:
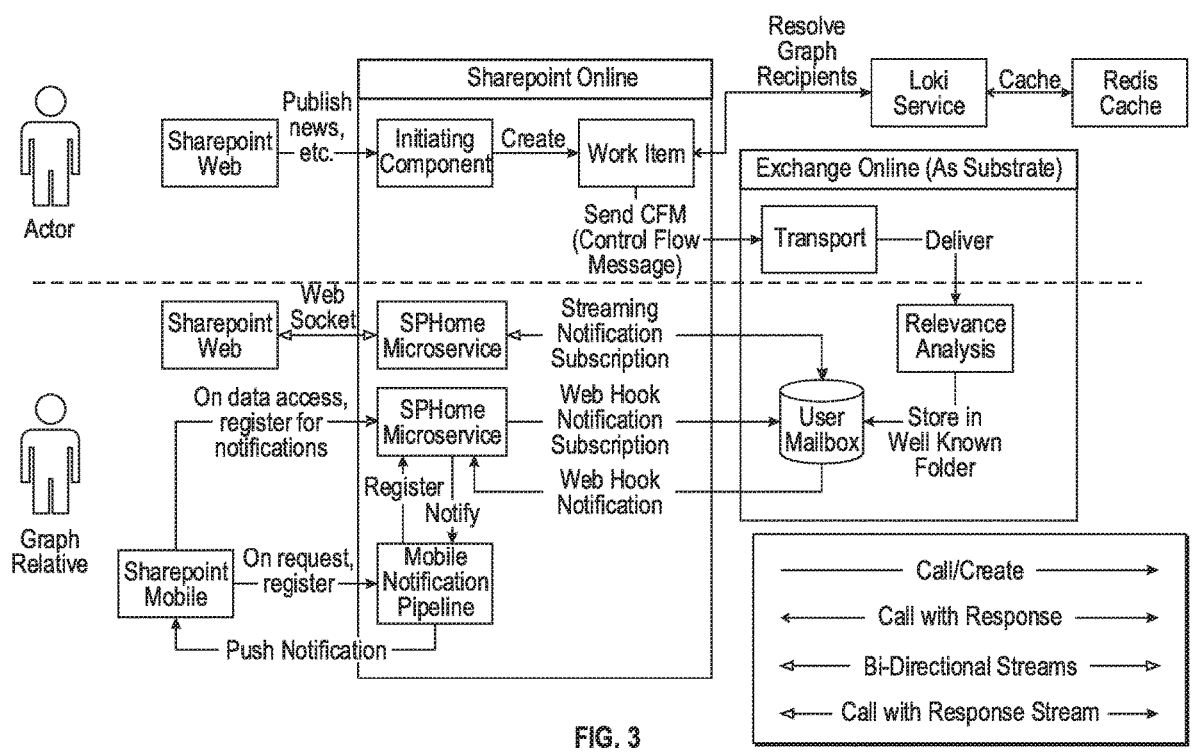
FIG. 3 is a block diagram illustrating an exemplary design schematic according to various aspects of the disclosure.
Figure 4:
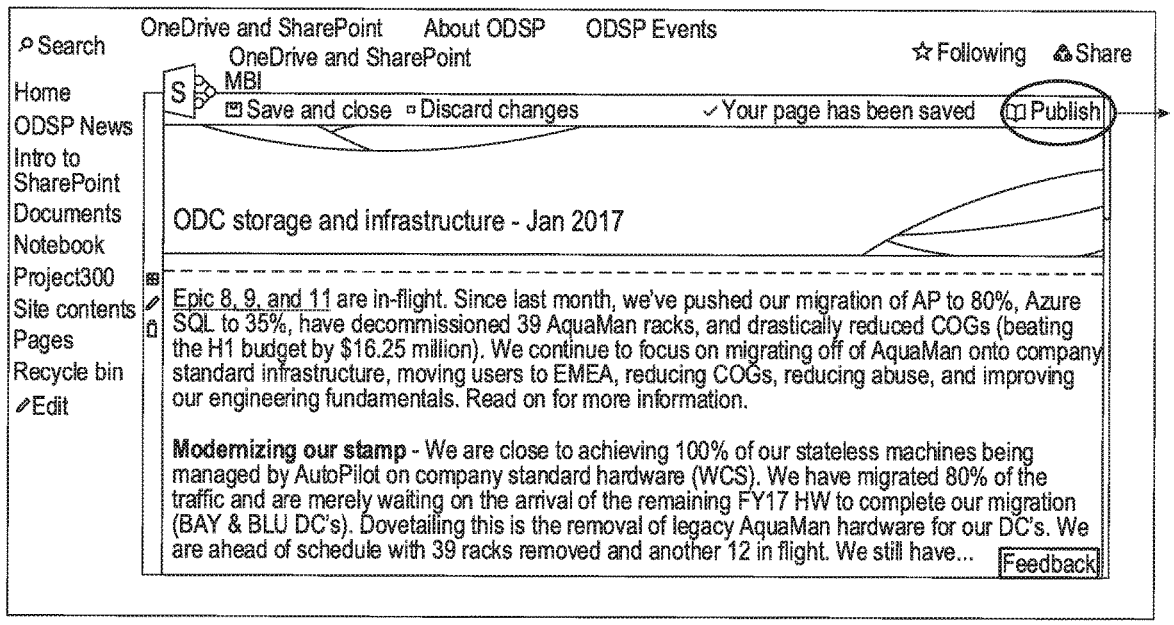
FIGS. 4-6 are exemplary screenshots according to various aspects of the disclosure.

In one exemplary embodiment, referring now to FIG. 3, an actor (e.g., a user of the document management system) publishes content via a web-based interface to the document management system (e.g., Sharepoint Web by Microsoft Corporation). FIG. 4 illustrates an exemplary screenshot from the perspective of the publishing user. In this example, the user creates an article entitled "ODC storage & infrastructure" and submits the article using the "Publish" link in on the page in the upper-right corner of the document.

Referring again to FIG. 3, the document management system (e.g., Sharepoint Online by Microsoft Corporation) identifies (205) the published article from the actor/user and initiates the "Initiating Component" and "Work Item" software components to generate a notification associated with the published content (210) as well as an expression (215) defining a list of one or more recipient users to receive notification of the published content. The system generates an electronic communication containing the notification and transmits (220) the communication to a system for distributing electronic communications (Exchange Online by Microsoft Corporation in this example). In this context, an "electronic communication" may include a data packet, text message, email, and/or any other type of electronic communication in any desired format.

In the exemplary method 200 depicted in FIG. 2, the system generates an expression (215) that represents the set of "potentially interested" parties to define a list of one or more recipient users to receive notice of the published content. In some embodiments, the system may generate the list of recipient users based on organizational information for a group of users (such as the hierarchy of managers and employees in a company), as well as information on the relationships between such users. In some exemplary embodiments, relationships between users (e.g., between a user and an author publishing a content item) may be determined based on a variety of information, such as a frequency of communications between the users, identifying users attending common meetings, and users co-authoring documents.

The expression may be of any length and in any format. In some embodiments, the expression may include instructions in a scripting language that, when executed, build a list of recipients for the notification. An exemplary expression is shown below:

RootUser
  UPN: <email address>
  Expand:
    WorkingWith (Count=10)
    DirectReports (Recurse=*)
      Expand:
        WorkingWith (Count=5)

In the example above, the expression (when executed) causes the system to start with a user ("RootUser"), get the top 10 people that user works with, get the direct reports of that user, and get the top 5 people that the reports each work with. The system recursively finds the direct reports (and the respective top 5 working individuals for each respective direct report) for all levels of the organization.

In the example depicted in FIG. 3, the "Initiating Component" generates the expression and passes it to the "Work Item" component, though generation and handling of the recipient expression (as well as the other functionality of the system) may be performed in any suitable manner by alternate embodiments of the present disclosure. The work item, passes the recipient expression to the Loki service to resolve the list of recipients to whom the notification is to be delivered.

The system distributes the electronic communication containing the notification to one or more of the recipients in the list of recipients. In some exemplary embodiments, the system may distribute the electronic communication to users in the list of recipients via a user mailbox in an electronic communication distribution system associated with each respective recipient in the list of recipients. In the example depicted in FIG. 3, for instance, the system calls Exchange on behalf of the author to send a CFM (Control Flow message) to each of the recipients, passing the notification payload as the body of the CFM.

In this example, upon arrival at each recipient's mailbox, the "Transport" component of the Exchange Online system invokes a delivery agent registered to handle the CFMs. The delivery agent determines the relevance of the published content (225) for each recipient. For each respective recipient, the system publishes the notification (230) to the respective recipient if the content is determined to be relevant to the respective recipient, and abstains from publishing the content to the recipient otherwise. In some embodiments (as is depicted in FIG. 3) the electronic communication may be distributed to each potential recipient of the notification prior to determining whether the published content is relevant to each recipient. In other embodiments, the system may determine whether the content is relevant to a recipient before distributing the notification to the user.

In the case where the communication is distributed to recipients prior to determining the relevance of the published content to the recipients, the system may selectively publish the notification to some users (e.g., where the published content is determined to be relevant to such users) while abstaining from publishing the notification to other users (e.g., where the published content is not determined to be relevant to such users).

The system may determine the relevance (or irrelevance) of a piece of content for a potential recipient of a notification based on a variety of criteria. The relevance of a piece of published content may be determined based on any selection of criteria, and the relevance of content may be determined using different criteria for different users. Moreover, the criteria for determining the relevance of a piece of content may be weighted differently. For example, the system may determine a piece of content is irrelevant for a user who lacks the necessary security clearance to view the content, and exclude such users from receiving notification of the published content. In some embodiments, the system may make a security determination separate from a determination of relevance. For example, if the system determines a user does not have adequate security credentials to access a piece of published content, it may omit such content from any further relevance analysis.

Relevance of content to a user may also be determined based on other characteristics of the content. For example, content may be determined to be relevant or irrelevant based on characteristics such as the age of the content (e.g., based on a time stamp when the content was published), the language(s) the content is written in in comparison to languages listed as spoken or read by the recipient, the types of content published (e.g., text, images, video, etc.), as well as based on one or more topics covered in the content.

In some exemplary embodiments, the system may analyze information associated with potential recipients of a notification to determine the relevance of the published content to such users. For example, the system may perform an analysis of the published content to identify various characteristics of the content and compare the characteristics to information associated with a user (e.g., from a user's profile on the system) to help determine the relevance/irrelevance of the content to the user. In such cases, the system may identify relevant or irrelevant content for a particular user based on an organizational relationship between the user and the author of the content (e.g., the author and user are in the same group, the user is a direct report of the author or vice versa, the author and user are both working on the same project within the organization, etc.). In one exemplary embodiment, the system may determine that a user is working—with the author, that the author is in reporting chain of the user, or author is in the reporting chain of another user B, where user A (the one getting notified) is working with user B. In this example, user A and user B who work together on a cross-group project will get notifications for content published from their respective managers, such as re-org announcements, etc. In this manner, the system can help notify users of content they are likely to find relevant (e.g., to their job functions) while also helping to avoid pushing notifications to users for content that is irrelevant and that they are unlikely to find of interest. Among other things, this helps preserve the significance of the push notification system since users are more likely to only receive notifications for content they will find to be of particular relevance.

Similarly, the system may determine the relevance of a piece of content based on feedback from other users of the system (e.g., within the document management system). Such feedback may include reviews (e.g., positive or negative) as well as comments. The system may analyze such feedback and, for example, include content as relevant in response to the content having at least a predetermined rate of positive feedback. Additionally or alternatively, content may be found relevant or irrelevant based on the keywords found within the comments associated with the published content. In other exemplary embodiments, the system may determine relevance by determining a user's preference to content based on explicit or implicit topic identification. For example, if a user follows a topic, or tends to click on news articles on certain topic, then the system may determine that a new news article on the same topic is likely going to be relevant to the user.

The system may publish notifications to users in a variety of different ways. For example, the system may send an email, text, or other communication to a user to alert the user to the published content. In another example, referring now to FIG. 5, the content published by the author in FIG. 6 is identified in a popup notification at the top of the screen of a user's mobile computing device. The notification may include any desired information in any format, and publishing the notification to a particular recipient may include adding customized content (e.g., based on information specific to the recipient, such as the recipient's name) to the notification prior to publishing the notification.

Figure 5:
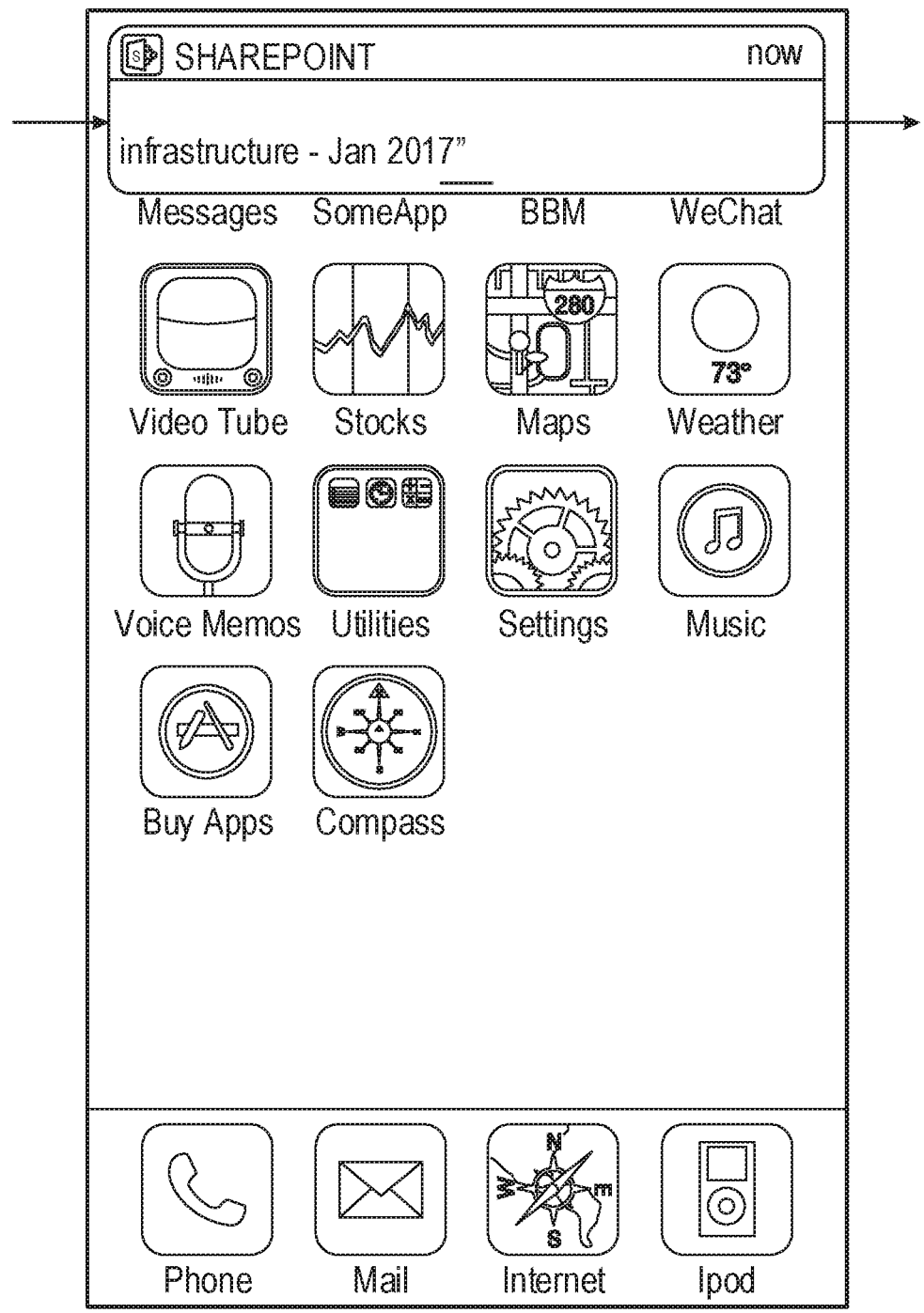
Figure 6:
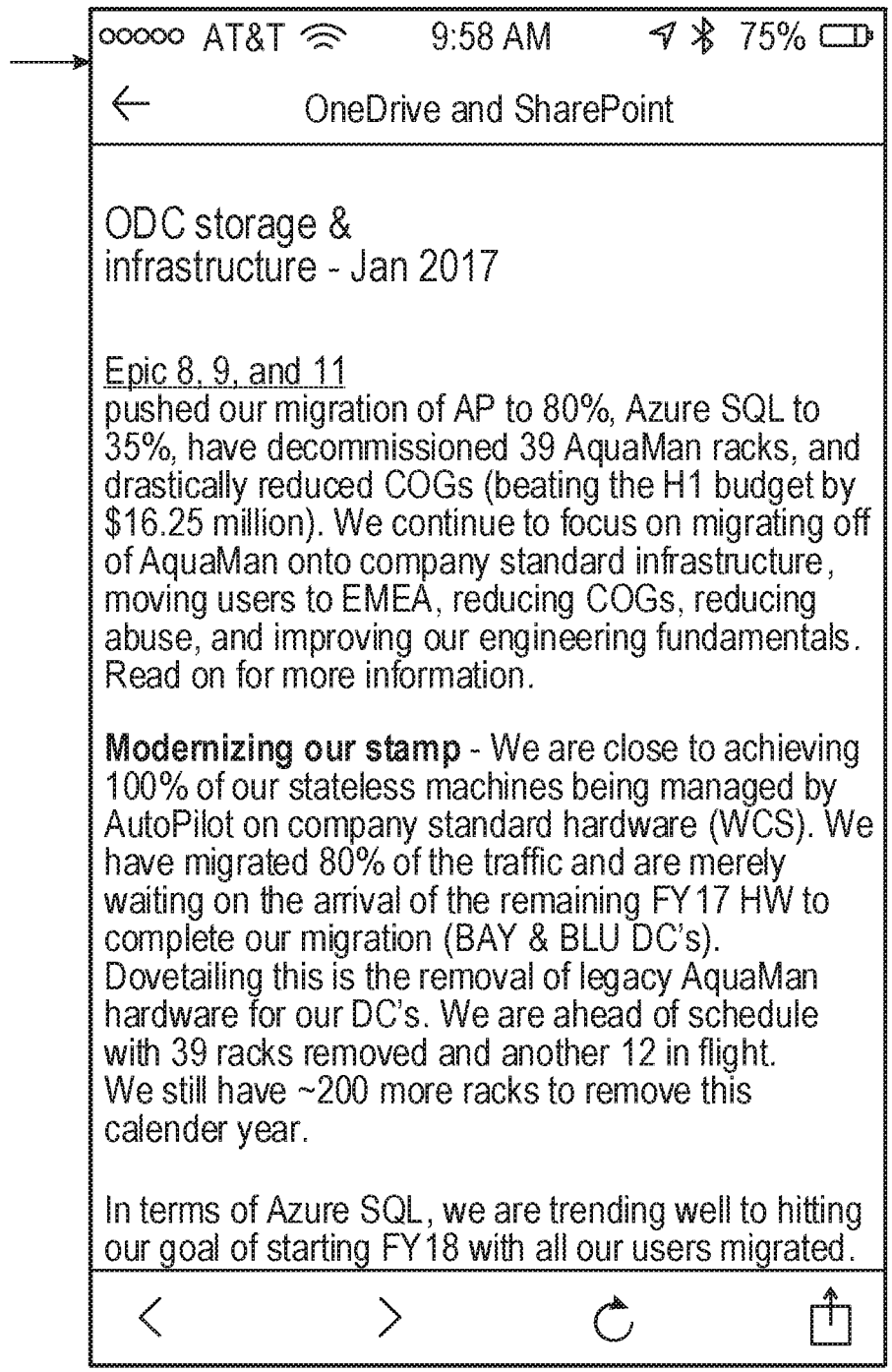

In FIG. 5, for example, the notification includes the notification alerts the user to the name of the author and the name of the article published by the author, and provides a selectable link that, when selected by the user, opens a page displaying the content (shown in FIG. 6). In some embodiments, the system may provide the user with preference options to affect the types of content the user is notified about, and such preferences may be used in determining the relevance of content for the user.

Notifications may be provided to users based on the software and/or hardware of the computing devices operated by different users, and notifications may be thus provided to different users in different formats and in different ways. In some exemplary embodiments, for instance, notifications to web clients may be serviced via streaming notifications from an electronic communication distribution system (e.g., Exchange in FIG. 3).

Figure 7:
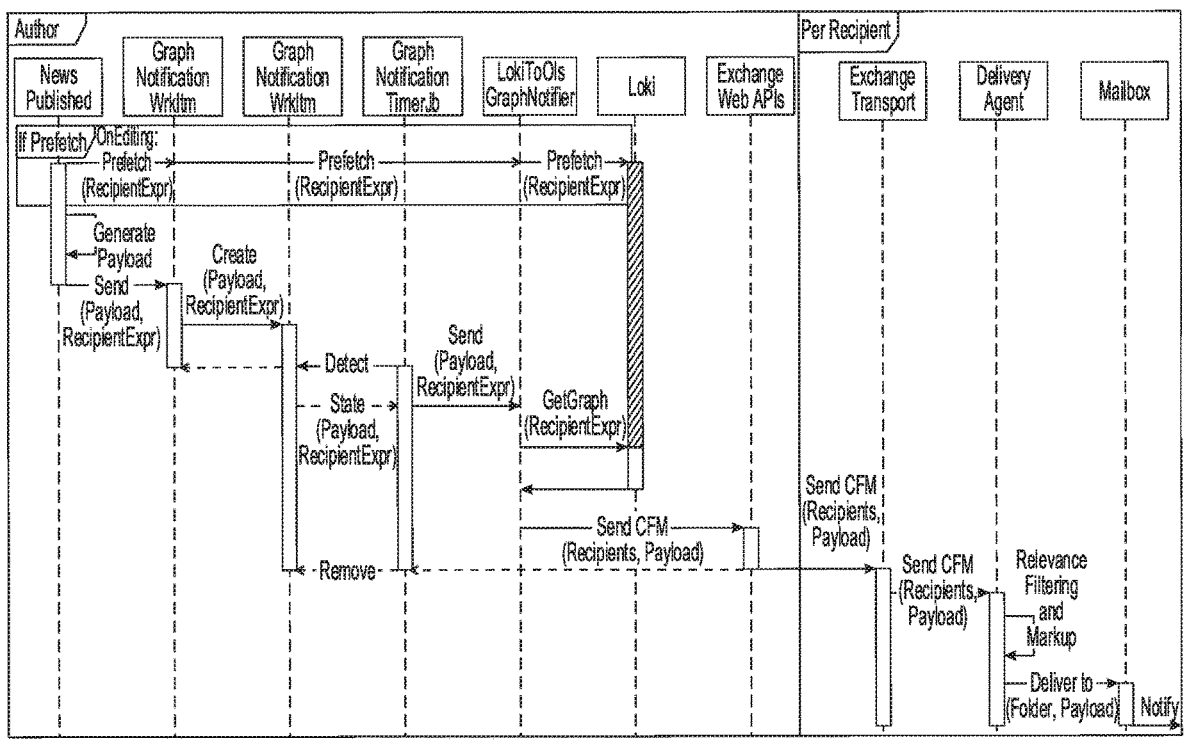
FIGS. 7-10 are functional diagrams according to various aspects of the disclosure.

FIG. 7 illustrates an exemplary functional diagram for providing notifications to mobile clients in conjunction with the "WebHook" notification mechanism operating in conjunction with Exchange from Microsoft Corp. In this example, the mobile client signals Exchange to start sending notifications via the "SPHome" microservice. The microservice registers with Exchange to receive WebHook notifications for that user. Upon receiving a notification from Exchange, the SPHome microservice will transmit the notification off to the Notification pipeline to push the notification to the mobile device.

Figure 8:
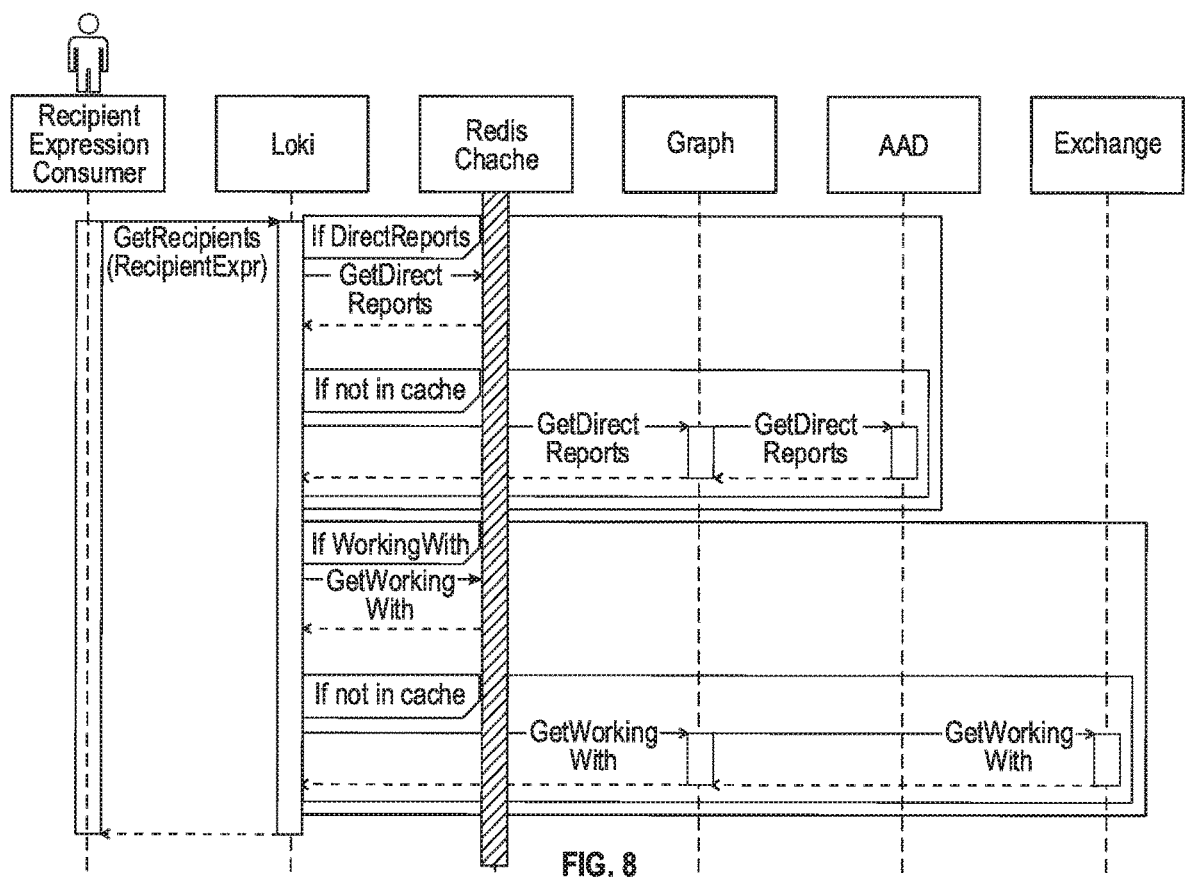

FIG. 8 illustrates an exemplary functional diagram associated with the "Loki" component shown in FIG. 3. In this example, the Loki component provides a caching layer for more expensive (e.g., that require a certain amount of computational time, memory, and/or processing power) queries. For example, given an email address, the Loki components can find the direct reports of that user. As described above, the Loki component also parses the recipient expression to identify the list of potential recipients for the notification.

Figure 9:
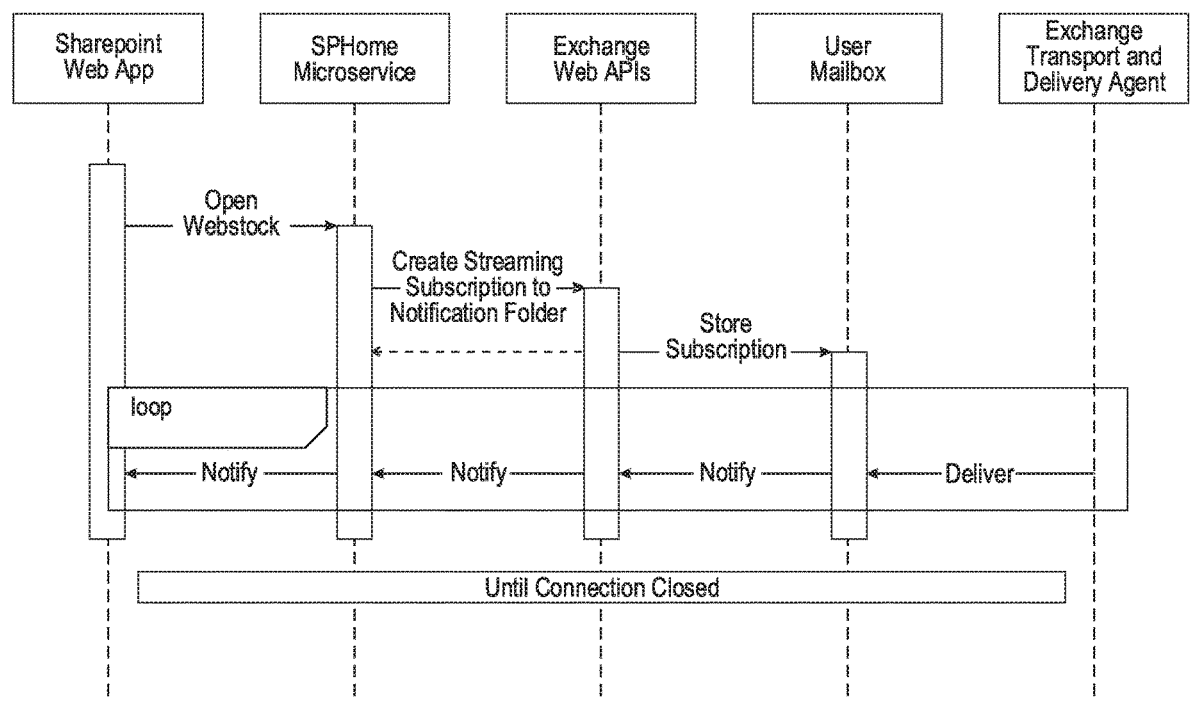

FIG. 9 illustrates an exemplary functional diagram for sending web notifications to a web client actively connected to the service. In some embodiments, the web notifications may appear to users as "toast" pop-ups with information related to the published content. The system may provide "streaming" notifications via Exchange. For example, Exchange may provide "pending" notifications where the client device of a user requests a notification and the connection between the client device and the system stays active until a notification is sent to the client device, after which the connection is closed. In this example, the client computing device reconnects to the system to get the next notification. The Exchange system may also provide "hanging" notifications where the client computing device of the user requests notifications and the connection stays active as with the "pending" notifications, but notifications are sent back on the response stream and the connection isn't closed until a timeout occurs or until the client computing device closes the connection.

Figure 10:
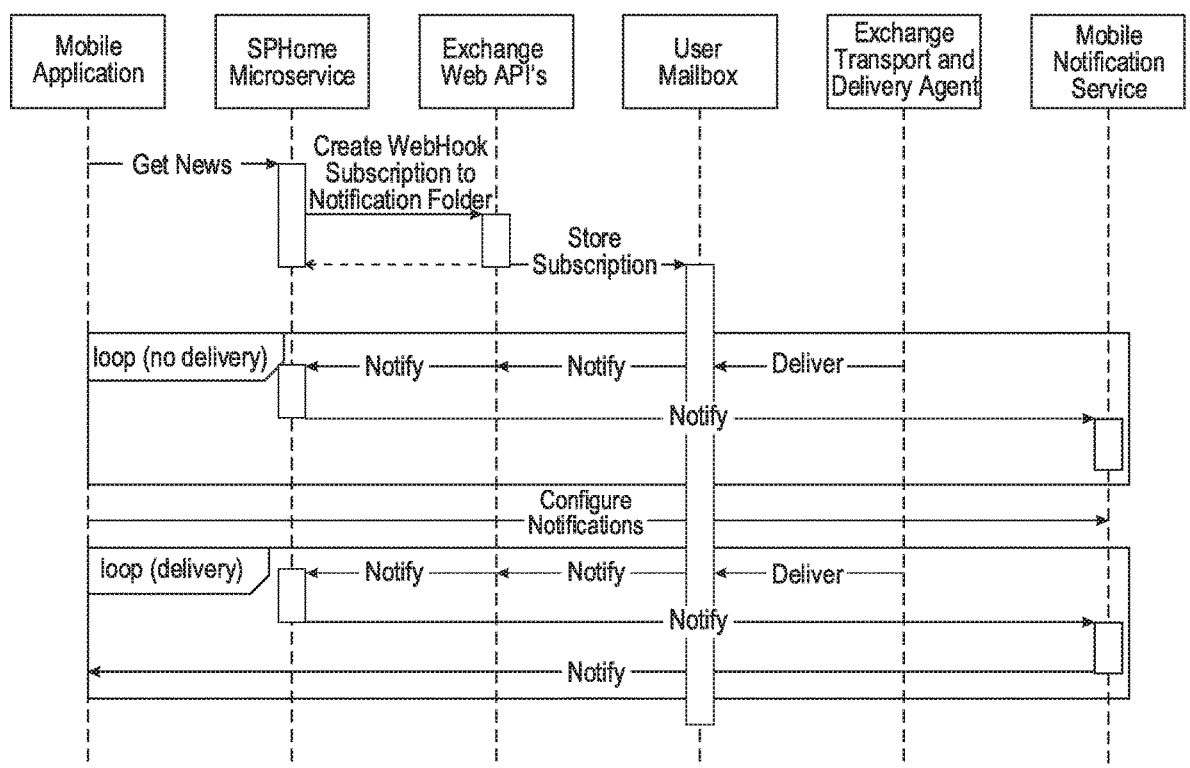

FIG. 10 illustrates another exemplary functional diagram for sending notifications to an application on a client mobile device of a user. In this example, the application (or client mobile device itself) may not necessarily be actively connected to the system, rather notifications to the client device may appear as a balloon over the application icon on the display screen of the users' device to indicate the notification activity. The user may then activate the application to view the notifications. In some cases, streaming notification subscriptions in Exchange may have an expiration, and thus could become invalidated due to failure to respond to a notification. In such cases, the system may periodically "refresh" the subscription with Exchange. For example, the system may receive a signal from the application on the mobile device, such as requesting of data or addition of an explicit call, and (in response to the receipt of the signal) update the subscription.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Where a phrase similar to "at least one of A, B, or C," "at least one of A, B, and C." "one or more A, B, or C," or "one or more of A, B, and C" is used herein, it is intended that the phrase be interpreted to mean that A alone may be present in an embodiment, B alone may be present in an embodiment, C alone may be present in an embodiment, or that any combination of the elements A. B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
   a processor; and
   memory coupled to the processor and storing instructions that, when executed by the processor, cause the system to perform operations comprising:
   identifying content published via a document management system;
   generating an expression defining a list of one or more recipient users of the document management system to receive notice of the published content;
   generating a notification associated with the published content;
   generating an electronic communication containing the notification;
   distributing the electronic communication to each respective recipient in the list of one or more recipients, wherein distributing the electronic communication to each respective recipient includes distributing the electronic communication to a respective user mailbox in an electronic communication distribution system associated with each respective recipient in the list of one or more recipients, wherein the electronic communication is distributed to each respective user mailbox prior to determining whether the published content is relevant to each respective recipient;

determining whether the published content is relevant to each respective recipient in the list of one or more recipients, without receiving a criteria selection for the published content from the one or more recipient users, after each respective recipient has received the electronic communication; and for each respective recipient in the list of one or more recipients, publishing the notification to the respective recipient if the content is determined to be relevant to the respective recipient, and abstaining from publishing the notification to the respective recipient otherwise, wherein publishing the notification causes a push notification at a mobile device of the respective recipient.

2. The system of claim 1, wherein determining the relevance of the published content includes determining the published content is irrelevant for a respective recipient based on the respective recipient lacking a security clearance to view the published content.

3. The system of claim 1, wherein publishing the notification to a respective recipient includes adding customized content to the notification prior to publishing the notification, wherein the customized content is based on information regarding the respective recipient.

4. The system of claim 1, wherein determining the relevance of the published content includes identifying a hierarchy of an organization to which an author of the published content and a respective recipient belongs, and wherein the published content is determined to be relevant to the respective recipient based on a relationship between the author and the respective recipient within the hierarchy.

5. The system of claim 4, wherein the relationship between the author and the respective recipient is determined based on one or more of: a frequency of communications between the respective user and the author, the respective user and the author attending common meetings, and the respective user and author co-authoring documents.

6. The system of claim 1, wherein determining the relevance of the published content is based on feedback from users of the document management system.

7. The system of claim 1, wherein determining the relevance of the published content is based on characteristics of the published content.

8. A computer-implemented method comprising:

identifying, by a computer system, content published via a document management system;

generating, by the computer system, an expression defining a list of one or more recipient users of the document management system to receive notice of the published content;

generating, by the computer system, a notification associated with the published content;

generating, by the computer system, an electronic communication containing the notification;

distributing, by the computer system, the electronic communication to each respective recipient in the list of one or more recipients, wherein distributing the electronic communication to each respective recipient includes distributing the electronic communication to a respective user mailbox in an electronic communication distribution system associated with each respective recipient in the list of one or more recipients, wherein the electronic communication is distributed to each respective user mailbox prior to determining whether the published content is relevant to each respective recipient;

determining, by the computer system, whether the published content is relevant to each respective recipient in the list of one or more recipients, without receiving a criteria selection for the published content from the one or more recipient users, after each respective recipient has received the electronic communication; and for each respective recipient in the list of one or more recipients, publishing the notification to the respective recipient if the content is determined to be relevant to the respective recipient, and abstaining from publishing the notification to the respective recipient otherwise, wherein publishing the notification causes a push notification at a mobile device of the respective recipient.

9. The method of claim 8, wherein determining the relevance of the published content includes determining the published content is irrelevant for a respective recipient based on the respective recipient lacking a security clearance to view the published content.

10. The method of claim 8, wherein publishing the notification to a respective recipient includes adding customized content to the notification prior to publishing the notification, wherein the customized content is based on information regarding the respective recipient.

11. The method of claim 8, wherein determining the relevance of the published content includes identifying a hierarchy of an organization to which an author of the published content and a respective recipient belongs, and wherein the published content is determined to be relevant to the respective recipient based on a relationship between the author and the respective recipient within the hierarchy.

12. The method of claim 11, wherein the relationship between the author and the respective recipient is determined based on one or more of, a frequency of communications between the respective user and the author, the respective user and the author attending common meetings, and the respective user and author co-authoring documents.

13. The method of claim 8, wherein determining the relevance of the published content is based on feedback from users of the document management system.

14. The method of claim 8, wherein determining the relevance of the published content is based on characteristics of the published content.

15. A non-transitory computer-readable medium storing instructions that, when executed by a computer system, cause the computer system to perform operations comprising:

identifying content published via a document management system;

generating an expression defining a list of one or more recipient users of the document management system to receive notice of the published content;

generating a notification associated with the published content;

generating an electronic communication containing the notification;

distributing the electronic communication to each respective recipient in the list of one or more recipients, wherein distributing the electronic communication to each respective recipient includes distributing the electronic communication to a respective user mailbox in an electronic communication distribution system associated with each respective recipient in the list of one or more recipients, wherein the electronic communication is distributed to each respective user mailbox prior to determining whether the published content is relevant to each respective recipient;

determining whether the published content is relevant to each respective recipient in the list of one or more recipients, without receiving a criteria selection for the published content from the one or more recipient users, after each respective recipient has received the electronic communication; and for each respective recipient in the list of one or more recipients, publishing the notification to the respective recipient if the content is determined to be relevant to the respective recipient, and abstaining from publishing the notification to the respective recipient otherwise, wherein publishing the notification causes a push notification at a mobile device of the respective recipient.

* * * * *